United States Patent
Kumazaki et al.

(10) Patent No.: US 6,832,151 B2
(45) Date of Patent: Dec. 14, 2004

(54) VEHICLE ENGINE CONTROL SYSTEM HAVING WIRELESS AND AUTOMATIC ENGINE START OPERATION

(75) Inventors: Takeshi Kumazaki, Okazaki (JP);
Ifushi Shimonomoto, Okazaki (JP);
Toshio Shimomura, Chiryu (JP)

(73) Assignee: DENSO Corporation, Kariya (JP)

( * ) Notice: Subject to any disclaimer, the term of this patent is extended or adjusted under 35 U.S.C. 154(b) by 29 days.

(21) Appl. No.: 10/337,893

(22) Filed: Jan. 8, 2003

(65) Prior Publication Data

US 2003/0135321 A1 Jul. 17, 2003

(30) Foreign Application Priority Data

Jan. 11, 2002 (JP) ........................................ 2002-004756
Jun. 5, 2002 (JP) ........................................ 2002-164340

(51) Int. Cl.[7] ............................. G06F 19/00; G06G 7/70
(52) U.S. Cl. ................... 701/112; 123/198 DC; 123/198 DB; 123/179.4; 302/10.3; 302/10.4; 302/10.5; 302/10.6; 701/102; 701/113; 701/115
(58) Field of Search .................. 701/102, 113, 701/115, 112; 307/10.3, 10.2, 10.4, 10.5, 10.6; 123/179.4, 179.3, 198 DC, 198 DB

(56) References Cited

U.S. PATENT DOCUMENTS

| | | | | |
|---|---|---|---|---|
| 4,494,497 A | * | 1/1985 | Uchida et al. ............ | 123/179.4 |
| 5,708,308 A | * | 1/1998 | Katayama et al. ......... | 307/10.5 |
| 5,928,296 A | * | 7/1999 | Trzeciak ...................... | 701/32 |
| 5,973,411 A | * | 10/1999 | Tado et al. ................ | 307/10.5 |
| 6,275,759 B1 | * | 8/2001 | Nakajima et al. ............ | 701/54 |
| 6,351,703 B1 | * | 2/2002 | Avery, Jr. ................... | 701/112 |
| 6,434,475 B2 | * | 8/2002 | Kaneko et al. ............. | 701/112 |
| 6,671,612 B2 | * | 12/2003 | Fuse .......................... | 701/112 |

* cited by examiner

Primary Examiner—Willis R. Wolfe
Assistant Examiner—Johnny H. Hoang
(74) Attorney, Agent, or Firm—Nixon & Vanderhye P.C.

(57) ABSTRACT

A method of controlling a vehicle engine involves determining a predetermined start operation, which is usually performed by a driver when the driver starts a parked vehicle, and that is not exclusively performed for starting the vehicle engine, verifying a code with a portable device after determining the predetermined start operation, and starting an engine automatically after successfully verifying the code. An engine control device has a start determining mechanism for determining a predetermined start operation, which is usually performed by a driver when the driver starts a parked vehicle, and that is not exclusively performed for starting a vehicle engine, a verifying mechanism for verifying a code with a portable device after determining the predetermined start operation, and a starting mechanism for controlling an automatic engine start after successfully verifying the code.

13 Claims, 5 Drawing Sheets

VEHICLE ENGINE CONTROL SYSTEM HAVING WIRELESS AND AUTOMATIC ENGINE START OPERATION

CROSS REFERENCES TO RELATED APPLICATIONS

This application is based on, claims the benefit of priority of, and incorporates herein by reference the contents of prior Japanese Patent Applications No. 2002-4756 filed on Jan. 11, 2002 and No. 2002-164340 filed on Jun. 5, 2002.

BACKGROUND OF THE INVENTION

1. Field of the Invention

The present invention relates to a vehicle engine control system, such as a smart key system using wireless communication, that has automatic engine start and engine stop.

2. Description of Related Art

Generally, there is a wireless system such as a smart key system that performs predetermined operations when a user who has a portable device (such as an electronic key) enters into a preset detecting area around a vehicle. The predetermined operations include locking and unlocking a door and starting and stopping the engine. In this system, the user as usual turns, through an ignition on setting (IG/ON) to a start setting (START), an engine switch installed in a key cylinder to start the engine without inserting an ignition key into the key cylinder. The engine is stopped by turning the engine switch to an engine stop setting (OFF).

Here, usual actions such as picking up an ignition key from a pocket or a bag and inserting it into a key cylinder are not necessary, which enhances usability. However, engine starting and engine stopping still involves a direct user initiated manipulation such as turning the engine switch, so that further improvement is desired.

SUMMARY OF THE INVENTION

An object of the present invention is to enhance user convenience by providing an automatic system for engine starting and engine stopping. To achieve the above object, a vehicle engine controller has an automatic engine starting feature that is executed by the following:

(1) a predetermined operation which is usual in an engine starting operation for a parked vehicle but that is not exclusive to engine starting (that is, not exclusively performed for starting an engine); and (2) successful code verification with a portable device.

In one embodiment of the invention, stopping an engine is executed by a predetermined operation which is usual in an engine stopping operation for a parked vehicle and is not exclusive to stopping an engine. That is, the predetermined operation is carried out for at least one other reason and not only to stop an engine.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The above and other objects, features and advantages of the present invention will become more apparent from the following detailed description made with reference to the accompanying drawings, wherein.

DETAILED DESCRIPTION OF THE preferred EMBODIMENTS

The following description of the preferred embodiment(s) is merely exemplary in nature and is in no way intended to limit the invention, its application, or uses.

Figure 1:
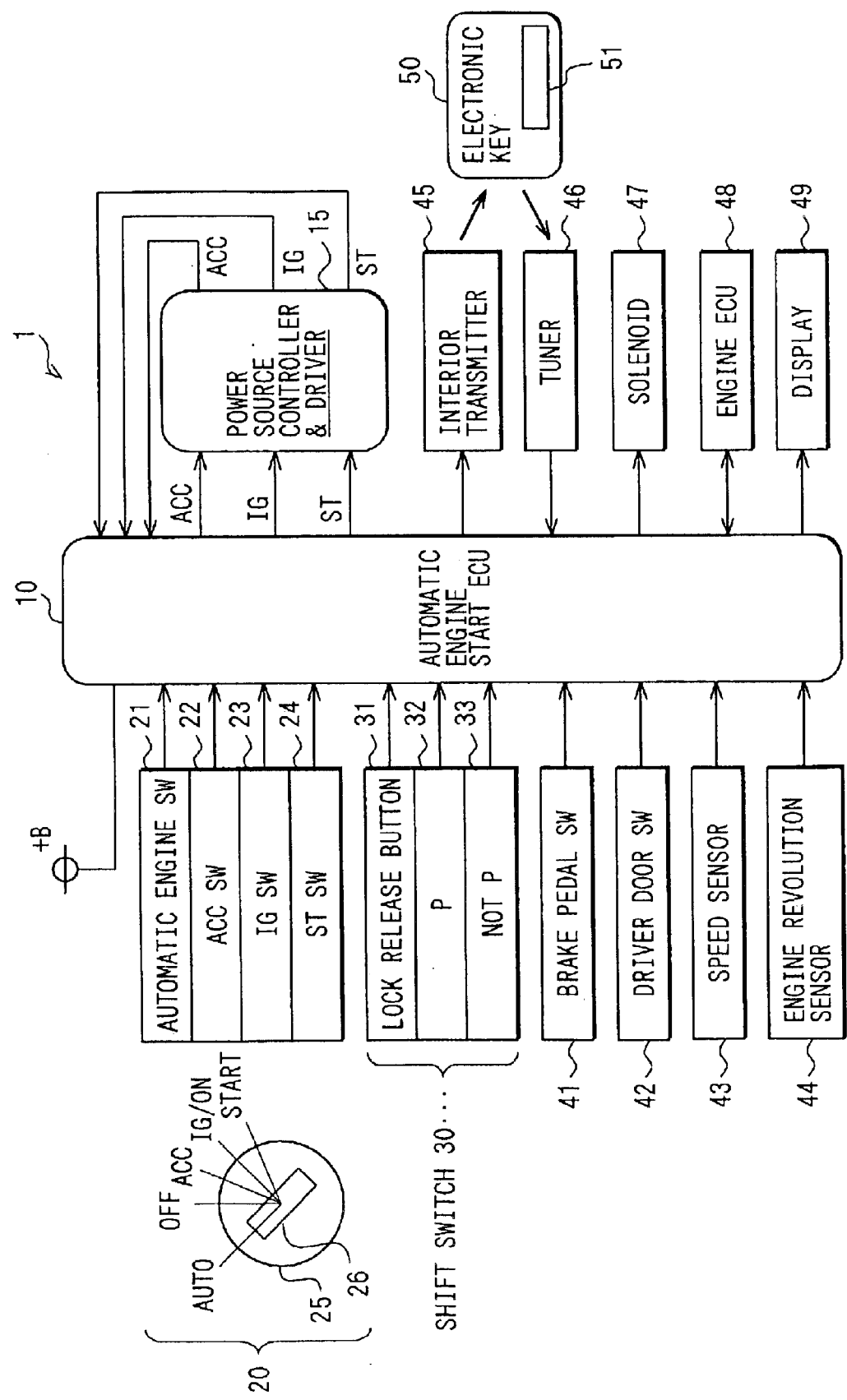
FIG. 1 is a block diagram of an electronic structure of a vehicle engine control device according to a first embodiment of the present invention.

Referring to FIG. 1, a VEC (vehicle engine control) system as an embodiment of the present invention includes a VEC (vehicle engine control) device 1 and an electronic key 50 as a portable device held by a user. The VEC device 1 mainly includes an automatic engine start ECU (electronic control unit) 10 that executes an automatic engine start and engine stop in a vehicle equipped with an automatic transmission. The automatic engine start ECU 10 consists of the following components (not shown): a CPU that controls various devices; a ROM that stores previously programmed figures or programs; a RAM that stores a figure or a flag during the computation; an A/D converter that converts analog signals to digital signals; an I/O interface, to which or from which digital signals are input or output, respectively; and a bus line connected to timers or the foregoing components. A flowchart which is described later is executed based on the controlling program previously stored in the ROM.

As shown FIG. 1, the automatic engine start ECU 10 is connected with other devices, thus composing the VEC device 10. These other devices are as follows: a power driver 15; an ignition switching device 20; a shift switch 30; a brake pedal switch 41 that determines whether the pedal has been pressed; a driver seat door courtesy switch 42 that detects whether the driver seat door has been locked or unlocked; a speed sensor 43 that detects a vehicle speed; an engine revolution sensor 44 that detects the number of engine revolutions (rpm); an interior transmitter 45 and tuner 46 that communicates with the electronic key 50; a solenoid 47 that drives an actuator for releasing a shift lock; and an engine ECU 48 that controls the engine; and a display 49.

The ignition switching device 20 is equipped with the following devices: an automatic engine switch 21; an accessory switch 22; an ignition on switch 23; a start switch 24; a rotary switch 25; and a manipulating knob 26. Here, each of the accessory switch 22, the ignition on switch 23 and the start switch 24 are well known switches, whose turned on status is sent to the power driver 15 by the automatic engine start ECU 10. The power driver 15 starts to supply power from a battery (not shown) to the corresponding power connectors or starter. Turning on the automatic engine start switch 21 causes the automatic engine start ECU 10 to execute controls relating to the automatic engine start and engine stop which will be described later.

The manipulating knob 26 of the rotary switch 25 is rotated clockwise or counterclockwise to choose one of the indicated settings. In order from left to right, the settings are: AUTO (to the automatic engine switch 21); OFF (not to any switch), ACC (to the accessory switch 22); IG/ON (to the ignition on switch 23); START (to the start switch 24). At the AUTO position, the automatic engine start ECU 10 executes the processes in FIGS. 2, 3 and 4, which will be described later, thus instructing the power driver 15 to supply power to the accessory power connector, the ignition power connector or the starter.

The shift switch 30 is equipped with a shift lock release button 31 in the automatic transmitter (not shown), a parking (P) range switch 32, and other than parking (NOT P) range switch 33, which specifically includes reverse, neutral, drive, second, and low (first) ranges. In the embodiment, the park and other than park positions are only necessary for the automatic engine start control, thereby being the only ones used for that control.

There are courtesy switches other than the driver seat courtesy switch 42. However, the driver seat courtesy switch 42 is only required in the embodiments of the present invention, therefore, it is the only one shown.

The electronic key 50 held by the user is equipped with a transponder, an antenna and memory that stores a preset identification (ID) code. Upon receiving a preset radio wave from the interior transmitter 45, the electronic key 50 automatically sends out the ID code to the tuner 46, which demodulates the received ID code to output to the automatic engine start ECU 10. The automatic engine start ECU 10 then verifies the received ID code of the electronic key 50 through operations such as comparing it with a genuine code stored in the ROM. Fulfillment of the predetermined conditions enables the automatic engine start or engine stop, which will be described later.

The electronic key 50 is also used for door lock and unlock control as a keyless entry system. Specifically, receiving a radio wave from another interior transmitter (not shown), the electronic key 50 automatically sends out the ID code to a door lock ECU through a tuner (not shown). The door lock ECU verifies the received ID code in order to start to control the door locking or unlocking. Carrying the electronic key 50 enables the user to utilize the automatic door locking and unlocking feature and the engine starting and stopping feature without any particular manipulation.

The electronic key 50 has a display 51 to which is output the automatic engine start status according to the following. Setting to AUTO the manipulating knob 26 of the rotary switch 25 in the VEC device 1 indicates that the automatic engine start and engine stop are executable (AUTO mode). At a predetermined time during communication with the electronic key 50, the VEC device 1 sends to the electronic key 50 a signal indicating the AUTO mode. The predetermined time can be, for instance, not only when the code verification is executed but also when the door lock and unlock control is executed since this embodiment additionally adopts the keyless entry system.

The electronic key 50 thereby receives the AUTO mode signal and then displays the corresponding information on the display 51. The display can consist of character displaying or different lighting patterns or states of an LED (light emitting diode). The lighting states are differentiated by switching between lit modes and black non lit modes, steady blinking, lighting only a particular number of LEDs, or lighting with various colors. The differentiation enables the electronic key 50 to inform the user of the mode state. In addition, the display 51 can be replaced with or be used with other informing methods. For instance, voice or vibration can be chosen as an informing method. Here, the informing method should be appealing to the vision, hearing, or other senses of the user.

On the other hand, the VEC device 1 can also display, at a predetermined time, the mode state on the display 49, which is installable in a meter panel. The predetermined time should be after the VEC device 1 sends out the mode state signal to the electronic key 50. Specifically, the mode state is displayed on the display 49 and the mode state signal is sent when the door is opened or after a user sits on the driver seat. These are easily determined using results from a sensor that detects a pressure difference upon the seat between occupied and unoccupied seats, or a sensor that detects whether the driver door is open or closed. The user may not recognize the output mode state until the user is getting in the vehicle or is seated on the seat. The above timings are thus appropriate and are not too late.

In the next place, referring to FIGS. 2, 3 and 4, the procedures of the automatic engine start and engine stop are explained as follows. The procedures are executed by the automatic engine start ECU 10 of the VEC device 1.

Figure 2:
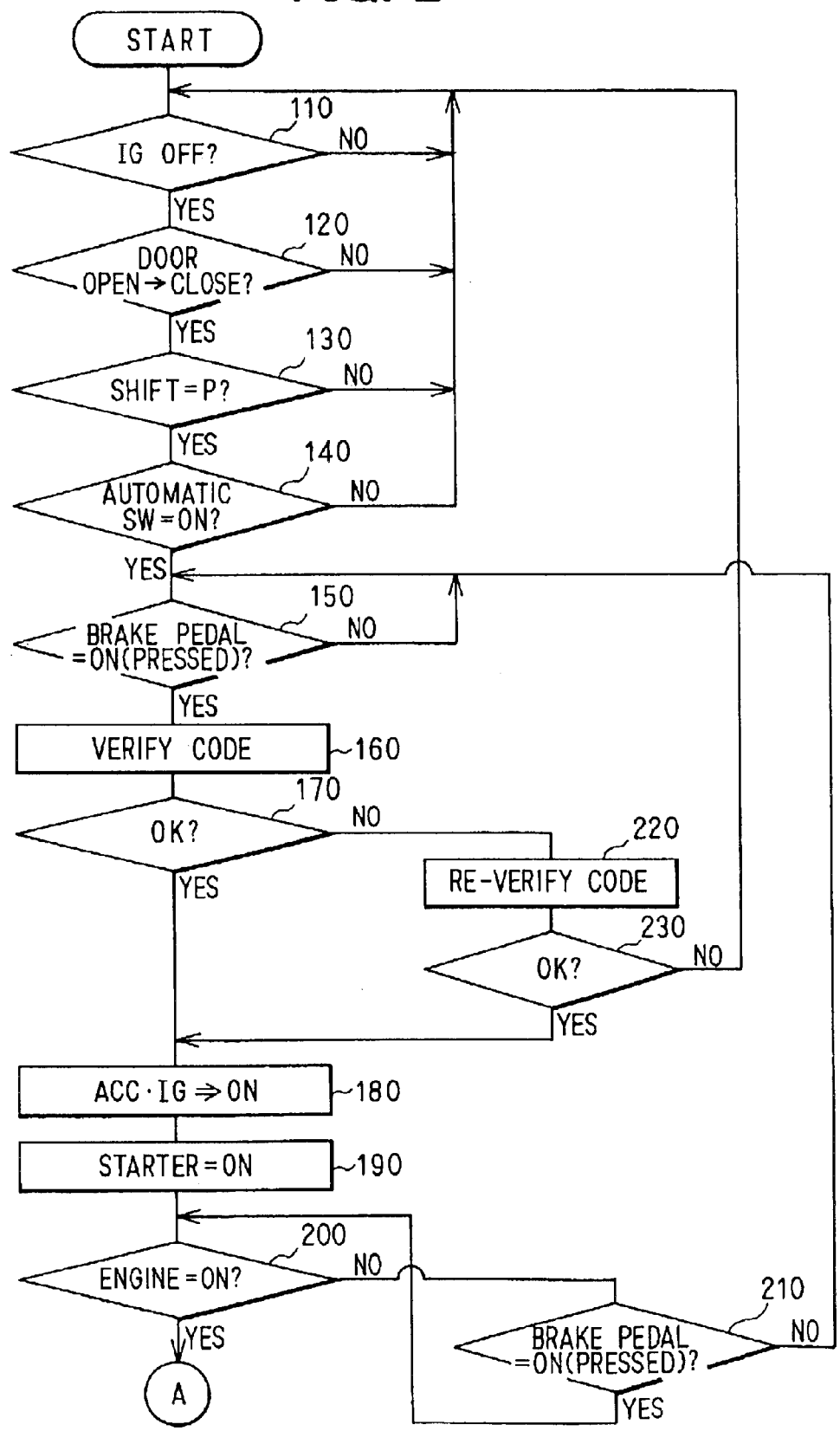
FIG. 2 is a flowchart of a first half of an engine starting operation of an automatic engine starting ECU according to the first embodiment.

As shown FIG. 2, four conditions are determined at steps 110, 120, 130 and 140, respectively, by the following: (1) an ignition on switch 23 is turned off; (2) a driver seat door is closed after being open, based on a detecting signal of a driver seat courtesy switch 42; (3) a shift position is in the park position, based on a detecting signal of a shift switch 30; and (4) a rotary switch 25 is set to an AUTO setting. If any one of the four determinations returns a negative response, the flow returns to step 110. The affirmation of all the four determinations leads to step 150.

At step 150, whether a brake pedal is pressed is determined based on a detecting signal of the brake pedal switch 41. The procedure repeats until the brake pedal is pressed at 150. When the brake pedal is pressed (YES at step 150), the following interior code verification is executed with the electronic key 50 at step 160 as follows: (1) the interior transmitter 45 transmits a preset radio wave as a command; (2) the electronic key 50 responds to the command with the ID code modulated; (3) the tuner 46 receives the ID code to demodulate and output; (4) the automatic engine start ECU 10 verifies the received ID code by comparing it with the reference ID code stored within itself.

Successful verification of the ID code (YES at step 170) leads the procedure to steps 180 and 190; the power driver is instructed to power to the accessory and ignition power connectors at step 180 and then the starter at step 190. At step 200, whether the engine starts is determined; a negative reply (NO at step 200) leads the procedure to step 210 to determine whether the brake pedal has been pressed. Affirmation (YES at 210) causes the procedure to be repeated at step 200; a negative reply (NO at step 210) returns the procedure to step 150.

In contrast, unsuccessful verification of the ID code (NO at step 170) leads the procedure to step 220 for the second verification. Affirmation (YES at step 230) leads the procedure to step 180; a negative reply (NO at step 230) returns the procedure to step 110. The second verification prevents failure due to the noise related reason. The verification can be adopted not only twice but three or more times. Failure results from the wrong ID code or unsuccessful acquisition of the ID code itself.

Figure 3:
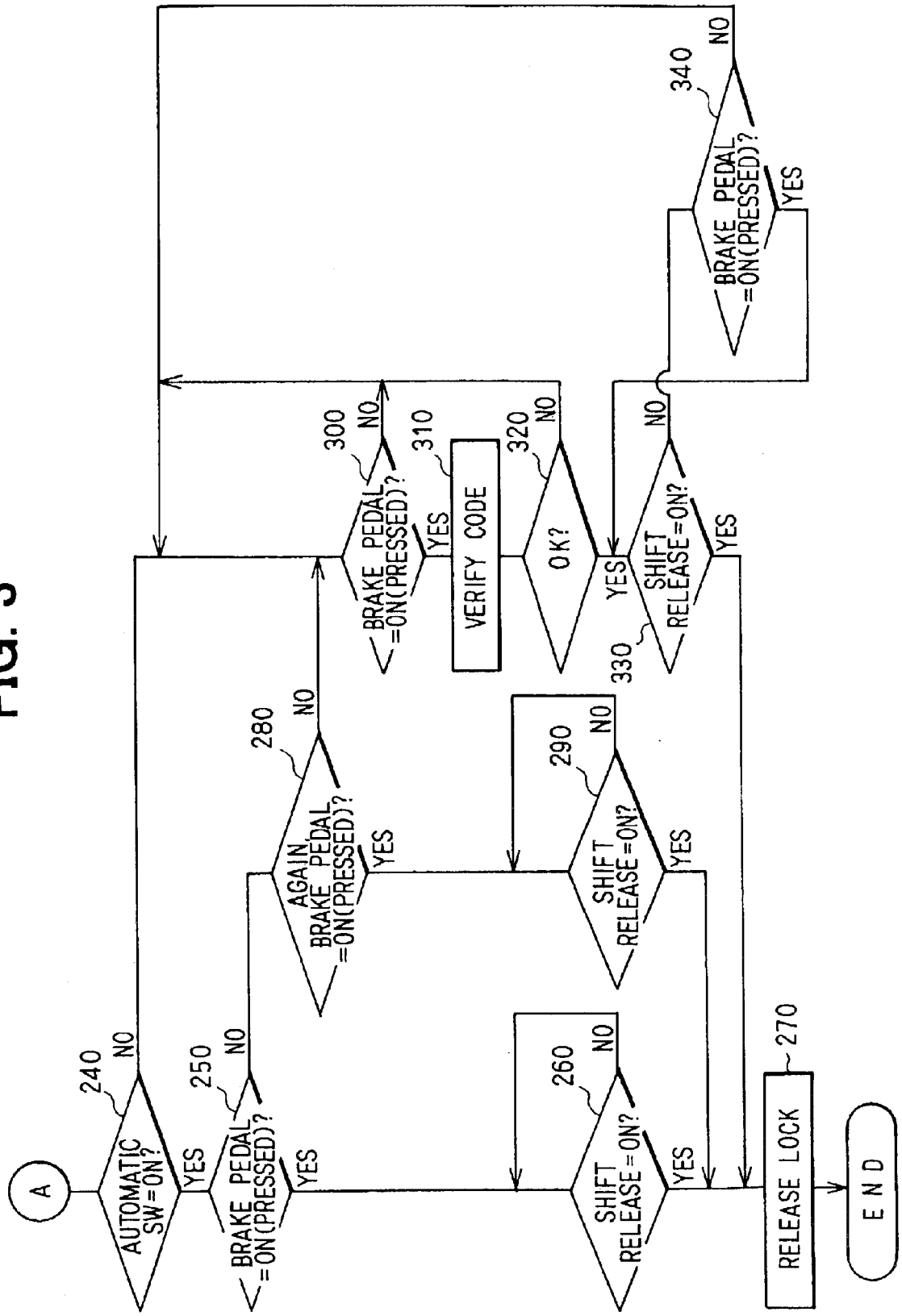
FIG. 3 is a flowchart of a second half of an engine starting operation of an automatic engine starting ECU according to the first embodiment.

Affirmation (YES at step 200) of the engine start leads the procedure to step 240 as shown in FIG. 3. At step 240, whether the engine automatically starts is determined. In the embodiment, engine starting can be executed through either automatic or manual engine starting. Automatic engine starting is described above using FIG. 2 while manual engine starting is accomplished through the usual manual manner using manipulating knob 26 of the rotary switch 25. The manual manner means turning the rotary switch 26 clockwise from: OFF→ACC→IG/ON→START as shown in FIG. 1. Which of the two manners is adopted is determined. That is, whether the rotary switch 25 is set to the AUTO setting is determined.

Adoption of the automatic engine start (YES at step 240) leads the procedure to step 250. If the brake pedal has been pressed (YES at step 250) and the shift lock release button 31 is on (YES at step 260), the procedure proceeds to step 270. Here, the shift lock is released through the solenoid 47 of the shift lock release. The shift position can be altered from the park position to other ranges. In the automatic engine start, though the engine automatically starts without any manipulation of the manipulating knob 26, the shift lock is still effective and prevents the vehicle from arbitrarily moving. In the manual engine start mode, the shift lock is not released until the shift lock button is pushed after the brake pedal is pressed. This secures the safety of the shift.

At step 250, if the brake pedal is not pressed, the procedure is lead to step 280, where whether the brake pedal has been pressed again for a preset period is determined. IF this determination is affirmative (YES at step 280) and the shift lock release button 31 is also affirmative (YES at step 290), release of the shift lock at step 270 occurs. Steps 280 and 290 are included since the following case may potentially occur. For instance, the driver may release his foot from the brake pedal for some reason. Here, if the driver depresses the pedal again immediately, it may be supposed that it is the same as continually stepping on the brake pedal. The preset period at step 280 should be set with regard to such a scenario.

When the brake pedal is not pressed for the preset period (NO at step 280), the procedure proceeds to step 300. On the other hand, when manual engine starting is adopted instead of automatic engine starting (NO at step 240), the procedure also proceeds to step 300. In this case, a few steps are involved to reach the final step 270, the shift lock release. These steps are as follows. The brake pedal is pressed (YES at step 300). The interior verification is executed with the electronic key 50 at step 310. The verification is approved (YES at step 320). The shift lock release button 31 is turned on at step 330, and therefore the shift lock is released at step 270. Here, the code verification with the electronic key 50 is involved before the vehicle starts to run. In addition, the negative reply at step 300 that the brake pedal has not been pressed or the negative reply at step 320 that the verification is failed returns the procedure to step 300. The negative reply at step 330 that the shift lock release button 31 is not turned on leads the procedure to step 340 to determine if the brake pedal is still pressed. The brake pedal still being pressed (YES at step 340) leads the procedure to step 330. The brake pedal not being pressed (NO at step 340) returns the procedure to step 300.

Continuing, the automatic engine stop is explained with reference to FIG. 4. At step 410, whether the shift position is somewhere other than in the park position after the engine starts is determined. When the shift position has not been set to other than a park position (NO at step 410), the procedure directly proceeds to the end by passing all steps after step 410. In contrast, when the shift position has been set to other than the park position (YES at step 410), the procedure sequentially executes steps 420–450. Specifically, whether the vehicle speed is zero km/h at step 420, whether the shift position is set to the park position at step 430, whether an air conditioner switch is turned off at step 440, and whether the brake pedal is pressed at step 450 are determined.

When at least one determination is answered in a negative fashion, the procedure returns to step 420 to begin asking the whether the conditions of steps 420 450 are satisfied. Conversely, when all four determinations are affirmed, the procedure proceeds to step 460 to execute stopping of the engine by instructing the power driver 15 to stop power from the battery to the ignition power connector.

Furthermore, when whether the driver seat door is locked with a key or a wireless key is affirmatively determined (YES at step 470), the power driver 15 is instructed to stop power from the battery from flowing to the accessory power connector. The routine of this procedure is thereby terminated.

As described above, the automatic engine start in the VAC device 1 of the embodiment is executed by the following approach, without manipulating the manipulating knob 26: (1) the rotary switch 25 of the ignition switching device 20 is set to the AUTO setting; (2) the predetermined start operation, which is usually operated by the driver when the driver starts a parked vehicle and which is not exclusively used for starting the engine of the vehicle (such as the procedure involving the pressing of the brake pedal, which is shown at step 150 in FIG. 2) is executed; (3) the code verification is successfully executed with the electronic key 50. On the other hand, the automatic engine stop is executed as follows: (1) the shift position is set to other than the park position after the engine starts; (2) the rotary switch 25 is set to the AUTO setting; (3) the predetermined stop operation, which is usually operated by the driver when the driver leaves the parked vehicle after stopping the engine and which is not exclusively operated for stopping the engine of the vehicle (such as shifting the shifter to the park position, turning off the air conditioner, and pressing the brake pedal as shown at steps 430 450 in FIG. 4) is executed.

The above operations are not exclusive to the engine start or engine stop in the ignition key manipulation or the engine switch manipulation of the smart key system. However, before or after these operations the engine start or engine stop is probably executed. Determination of the predetermined operations can hence lead to the automatic engine start or engine stop. This results in enhancing the convenience of the user who does not need to manipulate the manipulating knob 26 of the rotary switch 25. In addition, in the engine start the code is verified with the portable device normally held by the user after the above predetermined operations so that the engine start results from the successful verification. The code verification prevents an improper person (not qualified as a driver) from starting the engine even with the above predetermined operations. During engine starting, the brake pedal must be pressed, which is a safety feature which must be invoked before the vehicle is started. The condition that the shift position must be set to the park position, needless to say, also must be invoked if the vehicle is to be started. Furthermore, in the embodiment, the user can start or stop the engine, as usual, by manual operation of the manipulating knob 26 such as turning the rotary switch 25 from ACC through IG/ON to the START setting or returning the rotary switch 25 to the OFF setting, respectively.

After the automatic engine start with the rotary switch 25 is set to AUTO as shown in FIG. 2, the user can intentionally stop the engine by setting the rotary switch 25 to the OFF position using the manipulating knob 26. The automatic engine start is never executed after a manual engine stop as long as the rotary switch 25 is not set to AUTO instead of OFF. The automatic engine start is never executed, even after the automatic engine stop, as long as the rotary switch 25 is set to OFF instead of AUTO. For instance, when filling the gasoline tank in the gas station, the user only sets the rotary switch 25 to OFF from AUTO, so that the vehicle never begins to run as long as the rotary switch 25 is not set to AUTO instead of OFF, which approach is safe and favorable.

The readout on the display 49 or the electronic key 50 helps the user recognize the present mode. If setting to AUTO mode is output, the user easily realizes that the predetermined operation is only required for the engine to start. If a setting other than AUTO mode is output, the user will know to execute a manual engine start as soon as he views the readout.

The above first embodiment may be modified as follows.
(1) As the predetermined start operation, stepping on the brake pedal is adopted in the first embodiment. However, other conditions may be adopted. The conditions include turning on the shift lock release button 31, buckling of the seatbelt, and sitting on the driver seat. Here, the case where one of two or more of the conditions are completed is adoptable as the predetermined start operation. Since turning on the shift lock release button 31 is possible only during application of the brake pedal, turning on the shift lock release button 31 must accompany application of the brake pedal.

As the predetermined stop operation, the combined conditions of setting the shift position to the park position, turning off the air conditioner and stepping on the brake pedal are adopted in the first embodiment. On the other hand, the case where at least one of the following conditions is completed is adoptable as the predetermined stop operation. The conditions include setting of the shift position to the park position, applying the parking brake, unbuckling of the seat belt and leaving the vehicle. Leaving the vehicle can be determined through a seat pressure sensor which detects whether a driver is seated, a driver seat occupant image, or a door lock and unlock sensor. In addition, the code verification is used for detection when leaving the vehicle. The driver should not be located close to the driver seat when the interior transmitter 45 cannot communicate with the electronic key 50. For instance, when the keyless door lock and unlock system is applied, completion of the door lock can be used as a trigger for the automatic engine stop.

(2) Installment of an automatic transmission in the vehicle is assumed in the first embodiment. However, a manual transmission may be installed. In the case of a manual transmission with regard to the predetermined start operation, at least one of three conditions can be adopted. The conditions are pressing the clutch pedal, setting of the manual transmission to the neutral range upon buckling of the seat belt, and setting of the manual transmission to the neutral range upon sitting on the driver seat.

(3) As the vehicle ignition switching device 20, AUTO setting is integrated into a conventional smart key system consisting of OFF, ACC, IG/ON and START settings in the first embodiment. AUTO and OFF are thus selected using the manipulating knob 26. Only AUTO setting may be installed in theory since automatic engine start and engine stop requires the AUTO setting. However, the possibility of a forced engine stop by the user requires an OFF setting in addition to the AUTO setting. Moreover, another possibility of the manual engine start and engine stop also requires the OFF setting. These possibilities indicate that the integration in the first embodiment is favorable.

Figure 4:
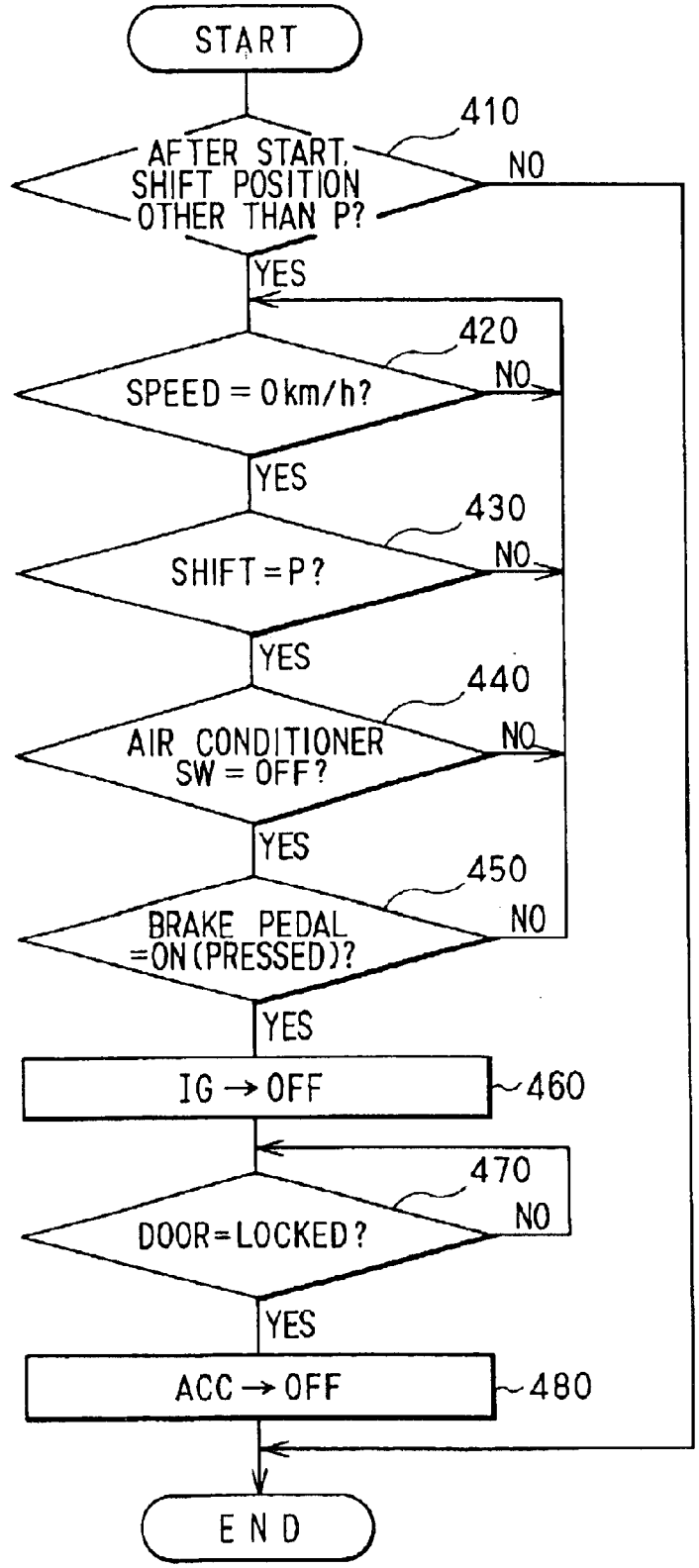
FIG. 4 is a flowchart of an engine stopping operation of an automatic engine starting ECU according to the first embodiment.

(4) Whether the shift position is set to other than the park position after the engine starts is determined at step 410 in the automatic engine stop routine as shown in FIG. 4. However, when the engine automatically starts, the condition of setting the shifter to a position other than the park position before the automatic engine start is inconvenient for the user. Stopping the engine, without the affirmation at step 410, therefore may be allowed on the assumption that other conditions except step 410 in FIG. 4 are affirmed. Additionally, leaving the vehicle must be affirmed.

(5) Only one of the engine start and engine stop may be automatically executed. For instance, a switch (for instance, called as an automatic engine start and stop switch) may be installed. Here, the user presses the switch to execute engine starting, while he again presses on the switch after the engine starts to stop the engine. For instance, engine starting is executed by pressing the switch and automatic engine stop is executed as in the first embodiment. On the other hand, the automatic engine start is executed as in the first embodiment and the engine stop is executed by pressing the switch. Therefore, the ignition switching device 20 is unnecessary in this embodiment.

(6) AUTO mode is determined if the manipulating knob 26 of the rotary switch 25 is pointed at the AUTO setting as shown FIG. 1 in the first embodiment. Another structure may be adopted as in FIG. 5, where an AUTO mode switch 52 is installed in the electronic key 50 with which the mode state can be selected. Each push of the AUTO mode switch 52 can switch between setting and releasing of the AUTO mode, and simultaneously displaying the setting and releasing of the AUTO mode on the display 51. The user recognizes, by observing the display 51, whether the AUTO mode is executable. A signal expressing the mode state of setting or releasing may be sent to the VEC device 1 while the electronic key 50 communicates with the VEC device 1 to control the door locking and unlocking. The VEC device 1 may store the mode state, which is used for determination at step 140 in FIG. 2, and furthermore which is displayed on the display 49. In addition, though the electronic key 50 has an AUTO mode switch 52 in addition to the display 51 in FIG. 5, the electronic key 50 possibly has only a manipulating knob through which the mode state is selected and also is visually indicated. Hereby, the display for the mode state becomes unnecessary.

Figure 5:
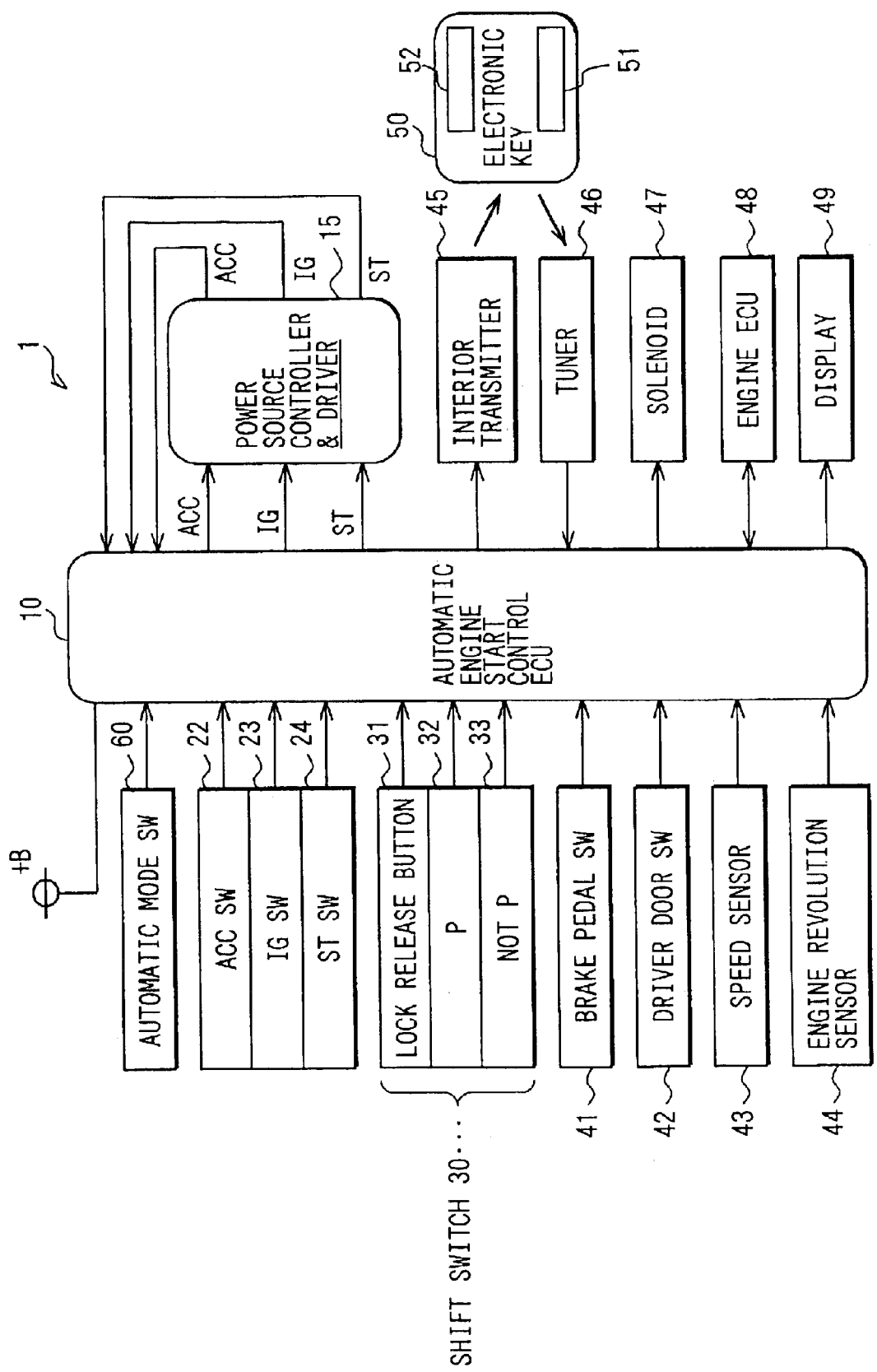
FIG. 5 is a block diagram illustrating an electronic structure of a vehicle engine control device according to a second embodiment of the present invention.

(7) As shown in FIG. 5, the VEC device 1 can have an AUTO mode switch 60 installed close to the driver's seat. This structure enables the user to select the mode state of setting or releasing with either of the AUTO mode switches 52, 60 of the electronic key 50 and the VCE device 1.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of controlling a vehicle having an automatic transmission, the method comprising:
    detecting a depression of a brake pedal, the depression of the brake pedal being usually performed by a driver when the driver starts a parked vehicle and not being exclusively performed for starting a vehicle engine;
    transmitting a radio signal upon the detection of the depression of the brake pedal;
    receiving a signal having an ID code transmitted from a portable electronic key upon the portable electronic key's receipt of the radio signal;

verifying the ID code; and controlling an automatic engine start upon the successful verification of the ID code.

2. A method of controlling a vehicle having a manual transmission, the method comprising:

detecting a depression of a clutch pedal, the depression of the clutch pedal being usually performed by a driver when the driver starts a parked vehicle and not being exclusively performed for starting a vehicle engine;

transmitting a radio signal upon the detection of the depression of the clutch pedal;

receiving a signal having an ID code transmitted from a portable electronic key upon the portable electronic key's receipt of the radio signal;

verifying the ID code; and controlling an automatic engine start upon successful verification of the ID code.

3. An engine control device for a vehicle, the engine control device comprising:

a start determining means for determining a predetermined start operation that is usually performed by a driver when the driver starts a parked vehicle and that is not exclusively performed for starting a vehicle engine;

a verifying means for verifying a code with a portable device after determining the predetermined start operation;

a starting means for controlling an automatic engine start after successfully verifying the code;

an engine stop accepting means for accepting an engine stop command from a driver who decides to stop the engine that is automatically started by the starting means;

a force stopping means for controlling a forced engine stop after accepting the engine stop command by the engine stop accepting means; and a stop release accepting means for accepting a stop release command by which the driver permits the automatic engine start by the starting means after the forcible engine stop by the force stopping means, wherein the force stopping means permits the automatic engine start by the starting means only when the stop release accepting means accepts the stop release command after the forcible engine stop by the force stopping means.

4. An engine control device for a vehicle having a manual transmission, the engine control device comprising:

a start determining means for determining a predetermined start operation involving depression of a clutch pedal, the predetermined start operation involving the depression of the clutch pedal being usually performed by a driver when the driver starts a parked vehicle and not being exclusively performed for starting a vehicle engine;

a transmitter for transmitting a radio signal when the start determining means determines that depression of the clutch pedal has occurred;

a receiver for receiving an ID code transmitted from a portable electronic key upon the portable electronic key's receipt of the radio signal;

a verifying means for verifying the ID code after determining the predetermined start operation; and a starting means for controlling an automatic engine start after successfully verifying the ID code.

5. An engine control device for a vehicle having an automatic transmission, the engine control device comprising:

a start determining means for determining a predetermined start operation involving depression of a brake pedal, the predetermined start operation involving the depression of the brake pedal being usually performed by a driver when the driver starts a parked vehicle and not being exclusively performed for starting a vehicle engine;

a transmitter for transmitting a radio signal when the start determining means determines that depression of the brake pedal has occurred;

a receiver for receiving a signal having an ID code transmitted from a portable electronic key upon the portable electronic key's receipt of the radio signal;

a verifying means for verifying the ID code after determining the predetermined start operation; and a starting means for controlling an automatic engine start after successfully verifying the ID code.

6. The engine control device of claim 5, further comprising:

an engine stop accepting means for accepting an engine stop command from a driver who decides to stop the engine that is automatically started by the starting means; and a force stopping means for controlling a forced engine stop after accepting the engine stop command by the engine stop accepting means.

7. The engine control device for a vehicle according to claim 5, the device further comprising:

a stop determining means for determining a predetermined stop operation, which is usually performed by the driver when the driver exits a parked vehicle along with stopping of the engine of the vehicle, and that is not exclusively operated as an engine stop of the vehicle; and a stopping means for controlling an automatic engine stop after determining the predetermined stop operation.

8. An ignition switching device for a vehicle, the device comprising:

a rotary switch capable of invoking one of a first, second, third and fourth settings; and a manipulating knob which is used by an operator to directly manipulate to choose one of the settings of the rotary switch, wherein, at the first setting, power is not supplied from a vehicle battery, wherein, at the second setting, power is supplied from the vehicle battery, wherein, at the third setting, engine starting occurs, wherein, at the fourth setting, automatic engine starting occurs by successful verification of a code with a portable device after determination of a predetermined start operation which is conducted by a driver until the driver starts to operate a parked vehicle and which is not exclusively operated for starting the engine of the vehicle, and wherein the second setting is positioned next to the first setting in a first rotative direction, the third setting is positioned next to the second setting in the first rotative direction, and the fourth setting is positioned next to the first setting in a second direction that is opposite to the first direction.

9. An ignition switching device for a vehicle according to claim 8, wherein at the fourth setting, an automatic engine stop is commanded by successful verification of a code with a portable device after determination of a predetermined stop operation, which is usually performed by a driver when the driver exits a parked vehicle along with stopping the engine of the vehicle, and which is not exclusively operated for an engine stop of the vehicle.

10. A portable device, along with an engine control device, included in an engine control system for a vehicle, wherein the system includes:

a start determining means for determining a predetermined start operation, which is usually performed by a user when the user starts a parked vehicle and which is not exclusively performed to start an engine of the vehicle;

a verifying means for verifying a code between the engine control device and the portable device after determining the predetermined start operation;

a starting means for controlling an automatic engine start after successfully verifying the code; and a mode accepting means for accepting, from the user, a mode state of setting to or releasing from an automatic mode which allows automatic engine starting by the starting means, wherein only during setting to the automatic mode, the starting means executes control of the automatic engine start, wherein the start determining, verifying and starting means are installed in the engine control device, and wherein the mode accepting means is installed in at least one of the engine control device and the portable device, the portable device further comprising:

an informing means for informing the user of the mode state accepted by the mode accepting means.

11. An engine control system for a vehicle, wherein the system includes an engine control device for a vehicle and a portable device, the system comprising:

a start determining means for determining a predetermined start operation which is usually performed by a user when the user begins to operate a parked vehicle and which is not exclusively performed for starting an engine of the vehicle;

a verifying means for verifying a code between the engine control device and the portable device after determining the predetermined start operation;

a starting means for controlling an automatic engine start after successfully verifying the code;

a mode accepting means for accepting, from the user, a mode state of setting to, or releasing from, an automatic mode which allows automatic engine starting by the starting means, wherein, only during setting to the automatic mode, the starting means executes to control the automatic engine start; and an informing means for informing the user of the mode state accepted by the mode accepting means, wherein the start determining, verifying and starting means are installed in the engine control device, wherein the mode accepting means is installed in at least one of the engine control device and the portable device, and wherein the informing means is installed in at least one of the engine control device and the portable device.

12. An engine control system for a vehicle according to claim 11, wherein the mode accepting means is installed in the portable device, wherein the informing means is installed in both of the engine control device and the portable device, wherein the informing means installed in the portable device continuously visually informs the user of the mode state, and wherein the informing means installed in the engine control device informs the user of the mode state after receiving a signal indicating the mode state from the portable device.

13. An engine control system for a vehicle according to claim 11, wherein the mode accepting means is installed in the engine control device, the informing means is installed in the engine control device and the portable device, the informing means installed in the portable device informs the user of the mode state after receiving a signal indicating the mode state from the engine control device, and the informing means installed in the engine control device informs the user of the mode state after transmitting a signal indicating the mode state to the portable device.

* * * * *